US012540295B2

(12) United States Patent
Baggi et al.

(10) Patent No.: US 12,540,295 B2
(45) Date of Patent: Feb. 3, 2026

(54) AQUEOUS ALKALINE ABRASIVE CLEANING COMPOSITION

(71) Applicant: Conopco Inc., Englewood Cliffs, NJ (US)

(72) Inventors: Paola Baggi, Casalpusterlengo (IT); Giles James Crowley, Leeds (GB); Andrew Stephen Jamieson, Wirral (GB); Teresa Lecce, Casalpusterlengo (IT); Laura Lupi, Casalpusterlengo (IT)

(73) Assignee: Conopco Inc., Englewood Cliffs, NJ (US)

( * ) Notice: Subject to any disclaimer, the term of this patent is extended or adjusted under 35 U.S.C. 154(b) by 321 days.

(21) Appl. No.: 18/250,545

(22) PCT Filed: Oct. 22, 2021

(86) PCT No.: PCT/EP2021/079349

§ 371 (c)(1),
(2) Date: Apr. 26, 2023

(87) PCT Pub. No.: WO2022/100982

PCT Pub. Date: May 19, 2022

(65) Prior Publication Data

US 2023/0399594 A1 Dec. 14, 2023

(30) Foreign Application Priority Data

Nov. 10, 2020 (EP) .................................... 20206582

(51) Int. Cl.

| | |
|---|---|
| ***C11D 17/00*** | (2006.01) |
| ***C11D 1/62*** | (2006.01) |
| ***C11D 1/835*** | (2006.01) |
| ***C11D 3/22*** | (2006.01) |
| ***C11D 3/33*** | (2006.01) |

(52) U.S. Cl.
CPC ............ *C11D 17/0013* (2013.01); *C11D 1/62* (2013.01); *C11D 1/835* (2013.01); *C11D 3/222* (2013.01); *C11D 3/33* (2013.01)

(58) Field of Classification Search
CPC ....... C11D 17/0013; C11D 1/62; C11D 1/835; C11D 3/222; C11D 3/33; C11D 1/72; C11D 3/48
USPC .......................................................... 510/397
See application file for complete search history.

(56) References Cited

U.S. PATENT DOCUMENTS

| | | | | |
|---|---|---|---|---|
| 4,457,856 A * | 7/1984 | Mitchell | ............. | B65D 47/268 510/237 |
| 6,458,753 B1 | 10/2002 | Haylett | | |
| 6,620,775 B2 * | 9/2003 | Winston | .................. | C11D 3/08 510/435 |
| 2003/0100460 A1 | 5/2003 | Winston et al. | | |
| 2023/0407213 A1 | 12/2023 | Bao et al. | | |

FOREIGN PATENT DOCUMENTS

| | | | |
|---|---|---|---|
| CN | 1246889 | 3/2000 | |
| CN | 103003407 | 3/2013 | |
| EP | 1448756 | 8/2005 | |
| GB | 2320723 | * 12/1997 | ............... C11D 3/48 |
| JP | 2018095849 | 6/2018 | |
| WO | WO 9813467 A1 | * 4/1998 | ............... C11D 3/33 |
| WO | WO0020545 | 4/2000 | |
| WO | WO03040284 | 5/2003 | |
| WO | WO03046116 | 6/2003 | |
| WO | WO2011000758 | 1/2011 | |

* cited by examiner

*Primary Examiner* — Eisa B Elhilo
(74) *Attorney, Agent, or Firm* — Ipsilon USA—NLO

(57) ABSTRACT

The present invention relates to aqueous alkaline abrasive cleaning compositions comprising quaternary ammonium compound that are stable over time.

14 Claims, No Drawings

AQUEOUS ALKALINE ABRASIVE CLEANING COMPOSITION

FIELD OF THE INVENTION

The present invention relates to aqueous alkaline abrasive cleaning compositions. More specifically it relates to a disinfecting agent comprising aqueous alkaline abrasive cleaning compositions that are stable over time and method to achieve the same.

BACKGROUND OF THE INVENTION

Cleaning products are well-known and play an important role in everyday life. Such products will usually contain a cleaning agent and, if disinfection is desired, also a disinfecting agent like for example a quaternary ammonium compound. Common cleaning agents include surfactants but may also encompass abrasives such as calcite particles. Cleaning products comprising abrasive particles are also known as 'creams' or 'scouring creams'. Such creams are used to clean household care hard surfaces in and around the home such as floors, kitchen tops and bathroom tiles. These creams may also be useful for cleaning dishware such as plates and are often used to remove tough stains like tea stains. Creams usually have an alkaline pH to assist in the cleaning performance.

For creams it is desired that the product keeps a uniform appearance over time. The abrasive particles, like for example calcite particles, need to be kept in suspension such that they are uniformly distributed. Consumers dislike it if over time, e.g. upon storage, the particles settle and form a sediment at the bottom of the container. This will require shaking of the product before use, and in some cases even shaking will not restore a proper distribution of the particles resulting in suboptimal cleaning and therefor a bad user experience.

In addition to cleaning, consumers sometimes prefer disinfection as well. To provide for this requirement a disinfecting agent can be added. A known disinfecting agent for this purpose and product format is hypochlorite. However, some consumers prefer a milder disinfecting agent, as hypochlorite has the risk of damaging delicate surfaces as it is a strong oxidizer. Quaternary ammonium compounds are an example of a milder disinfecting agent. However, due to the cationic nature of quaternary ammonium compounds they are not readily incorporated in creams.

Nowadays, more and more consumers prefer cleaning products with a good environmental profile. That is, they prefer products that are 'eco-friendly' and have less or no impact on the environment when the product is used. There is thus a growing need for cleaning products that mainly or only contain natural and/or biodegradable ingredients.

EP1448756B1 discloses aqueous alkaline solutions comprising at least a caustic and a viscosity-stabilizing amount of diutan gum.

However, it appears that not all viscosity-stabilizing systems allow for proper stabilization of an aqueous alkaline abrasive cleaning composition comprising a quaternary ammonium compound.

So, despite efforts thus far, there remains a need for cleaning compositions with a good environmental profile without compromising consumer satisfaction in terms of performance and/or storage stability.

SUMMARY OF THE INVENTION

We have found that a combination of diutan gum and aminocarboxylate sequestrant allows for a stable aqueous alkaline abrasive cleaning composition.

Accordingly, in a first aspect the invention relates to an aqueous alkaline abrasive cleaning composition comprising:

a. 1 to 60 wt % abrasive particles;
b. 0.05 to 0.5 wt % diutan gum;
c. 0.01 to 3 wt % aminocarboxylate sequestrant;
d. 0.05 to 3 wt % quaternary ammonium compound;

wherein the composition has a pH from 10 to 14 and wherein the abrasive particles are suspended.

The invention further relates to a method of stabilizing an abrasive particles and quaternary ammonium compound comprising aqueous alkaline cleaning composition, by including into the aqueous composition diutan gum and an aminocarboxylate sequestrant.

DETAILED DESCRIPTION OF THE INVENTION

Any feature of one aspect of the present invention may be utilized in any other aspect of the invention. The word "comprising" is intended to mean "including" but not necessarily "consisting of" or "composed of." In other words, the listed steps or options need not be exhaustive. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "x to y", it is understood that all ranges combining the different endpoints are also contemplated. Unless specified otherwise, amounts as used herein are expressed in percentage by weight based on total weight of the composition and is abbreviated as "wt %". The use of any and all examples or exemplary language e.g. "such as" provided herein is intended merely to better illuminate the invention and does not in any way limit the scope of the invention otherwise claimed. Room temperature is defined as a temperature of about 20 degrees Celsius.

Aqueous Cleaning Composition

The cleaning composition of the present invention is an aqueous cleaning composition, that is to say, the composition comprises water. The amount of water will depend on the desired concentration of the other ingredients but will at least be about 25 wt %, like for example at least 40 wt % or at least 60 wt %, but typically not more than 98 wt %. The amount of water preferably is from 25 to 98 wt %, more preferably 35 to 90 wt %, even more preferably 45 to 80 wt % and still more preferably 55 to 75 wt %.

The composition is liquid, that is, it can be poured, and preferably has a viscosity of 10 to 2000 mPa·s @ 20 s−1 at 25° C. The viscosity is measured using a HAAKE VT 550 viscosimeter using stainless steel spindle MVII. Depending on the required use characteristics the composition may be more or less viscous. For example, a water thin viscosity is desired if the composition is to be used in a trigger spray bottle. If dispensed from a squeeze bottle, a more viscous consistency may be desired. Preferably the composition has a viscosity of 120 to 1500 mPa·s @ 20 s−1 at 25° C. and more preferably of 300 to 1000 mPa·s @ 20 s−1 at 25° C. The desired viscosity can suitably be obtained by known methods like for example the use of a viscosity modifying agent. Alternatively, the amount of diutam gum and/or the amount of abrasive particles can be adjusted.

Abrasive

The cleaning composition of the present invention comprises 1 to 60 wt % abrasive particles. The abrasive particles act as a cleaning agent to provide cleaning in combination with the alkaline pH of the composition. Preferably the composition comprises 10 to 50 wt % and more preferably 15 to 40 wt % abrasive particles.

The Mohs scale of mineral hardness is a qualitative ordinal scale characterizing scratch resistance of various minerals through the ability of harder material to scratch softer material. Lower values indicate softer materials and higher values indicate harder materials. The abrasive particles should provide enough scouring to act as a cleaning agent, but at the same time should not damage the surface to be cleaned by excessive scratching. Preferably the abrasive particles have a Mohs hardness from 1 to 5, more preferably from 1 to 4 and still more preferably from 2 to 4.

The abrasive particles preferable have an average particle size between 2 and 500 micron, more preferable between 5 and 250 micron and still more preferably between 5 and 100 micron.

Suitable abrasive particles are well known and include synthetic particles, plant-based particles and mineral based particles. Suitable synthetic materials include plastic particles. Suitable plant-based materials include pits, kernels and stones that can be grinded to obtain the desired particle size. Suitable examples of plant-based abrasive particles include those based on cherry pits, apricot kernels and olive stones. Preferably the abrasive particles are mineral based, more preferably the abrasive particles are derived from carbonate and/or silicate based minerals. Examples of carbonate based minerals include calcite and dolomite. Calcite is a carbonate mineral and the most stable polymorph of calcium carbonate ($CaCO_3$) having a Mohs hardness value of 3. Dolomite is an anhydrous carbonate mineral composed of calcium magnesium carbonate, ideally $CaMg(CO_3)_2$. Dolomite has a Mohs hardness value of about 3.5 to 4. Preferably the abrasive particles are derived from calcite.

Diutan Gum

The cleaning composition of the present invention comprises 0.05 to 0.5 wt % diutan gum. Diutan gum is a biopolymer, more specifically heteropolysaccharide S-657, which is prepared by fermentation of a strain of *Sphingomonas* sp. ATCC 53159. Heteropolysaccharide S-657 is composed principally of carbohydrate, about 12% protein and about 7% (calculated as 0-acetyl) acyl groups, the carbohydrate portion containing about 19% glucuronic acid, and the neutral sugars rhamnose and glucose in the approximate molar ratio of 3:2. Details of the diutan gum structure may be found in an article by Diltz et al., "Location of 0-acetyl groups in S-657 using reductive-cleavage method" *Carbohydrate Research* 331 (2001) 265-270. Details of preparing diutan gum may be found in U.S. Pat. No. 5,175,278. Preferably the composition comprises 0.1 to 0.35 wt % diutan gum, more preferably 0.15 to 0.3 wt %.

Diutan gum has been described in EP1448756B1 as a viscosity-stabilizing gum for aqueous alkaline solutions. It was found that in cleaning compositions of the present invention diutan gum alone cannot provide for stable suspensions as it is not capable of keeping the abrasive particles in suspension upon storage. A sequestrant is needed to provide for a stable suspension upon storage.

Sequestrant

Compositions of the invention comprise an aminocarboxylate sequestrant.

Most preferably, the aminocarboxylate sequestrant is selected from 1N carboxylates, 2N carboxylates, 3N carboxylates and mixtures thereof.

Preferably, aminocarboxylates of the invention are selected from the amino(poly)carboxylates.

Preferably, the sequestrant is selected from aminocarboxylate comprising an —N(MOOCH3)2 group and/or an —N—CH2(CH2COOM)(COOM) group, wherein M is hydrogen, metal (e.g. alkali metal), ammonium or a mixture thereof, wherein the sequestrant is optionally substituted with one of more —SO3Na groups.

Preferably, the sequestrant of the invention is selected from salts of glutamic acid N,N-diacetic acid (GLDA),
beta-alanine diacetic acid,
ethylenediamine triacetic acid,
methyl glycine diacetic acid (MGDA),
diethylenetriamine penta-acetic acid,
ethylenediamine-N,N-disuccinic acid,
ethylenediamine di(sulfosuccinate) and
mixtures thereof.

The aqueous cleaning composition of the present invention comprises 0.01 to 3 wt % aminocarboxylate sequestrant, preferably 0.5 to 2.5 wt % and more preferably 1 to 2 wt %.

Preferably the aminocarboxylate sequestrant is selected from GLDA, MGDA and combinations thereof.

MGDA is the common abbreviation used for methylglycine diacetic acid trisodium salt and also known as trisodium dicarboxymethyl alaninate. GLDA is the common abbreviation used for glutamic acid diacetic acid tetra sodium salt.

It was surprisingly found that these sequestrants in combination with diutan gum provide for stable suspensions upon storage for compositions comprising abrasive particles and quaternary ammonium compound.

Preferably the aminocarboxylate sequestrant comprises MGDA and more preferably the sequestrant is MGDA.

Quaternary Ammonium Compound

The aqueous cleaning composition of the present invention comprises 0.05 to 3 wt % quaternary ammonium compound as a disinfecting agent. Preferably the composition comprises 0.1 to 2 wt % and more preferably 0.25 to 1.5 wt % of said quaternary ammonium compound.

Any quaternary ammonium compound can be used in the presently described technology. Examples of quaternary ammonium compounds include, for example, alkyl ammonium halides such as cetyl trimethyl ammonium bromide, alkyl aryl ammonium halides such as octadecyl dimethyl ammonium bromide, N-alkyl pyridinium halides such as N-cetyl pyridinium bromide, and the like. One suitable type of quaternary ammonium compound includes, for example, those in which the molecules contain amine, ether or ester linkages such as octyl phenoxy ethoxy ethyl dimethyl benzyl ammonium chloride, N-(laurylcocoaminoformylmethyl)-pyridinium chloride, and the like. Another effective type of quaternary ammonium compound include, for example, those in which the hydrophobic radical is characterized by a substituted aromatic nucleus as the case of lauryloxyphenyltrimehyl ammonium chloride, cetylaminophenyltrimethyl ammonium methosulfate, dodecylphenyltrimethyl ammonium methosulfate, dodecylbenzyltrimethylammonium chloride, chlorinated dodecylbenzyltrimethyl ammonium chloride, and the like. Preferably, the quaternary ammonium compound utilized in the practice of the present technology exhibit biocidal activity or are biocidal in nature.

Particularly useful quaternary ammonium compound germicides include compositions which include a single quaternary compound, as well as mixtures of two or more different quaternary compounds. Such useful quaternary compounds are available under the EMPIGEN, BARDAC, BARQUAT, HYAMINE, LONZABAC, and ONYXIDE trademarks, which are more fully described in, for example, McCutcheon's Functional Materials (Vol. 2), North American Edition, 1998, as well as the respective product literature from the suppliers identified below.

For example, BARDAC 205M is described to be a liquid containing alkyl dimethyl benzyl ammonium chloride (BKC), octyl decyl dimethyl ammonium chloride; didecyl dimethyl ammonium chloride, and dioctyl dimethyl ammonium chloride (50% active) (also available as 80% active (BARDAC 208M)); described generally in McCutcheon's as a combination of alkyl dimethyl benzyl ammonium chloride and dialkyl dimethyl ammonium chloride); BARDAC 2050 is described to be a combination of octyl decyl dimethyl ammonium chloridedidecyl dimethyl ammonium chloride, and dioctyl dimethyl ammonium chloride (50% active) (also available as 80% active (BARDAC 2080)); BARDAC 2250 is described to be didecyl dimethyl ammonium chloride (50% active); BARDAC LF (or BARDAC LF-80), described as being based on dioctyl dimethyl ammonium chloride (BARQUAT MB-50, MX-50, OJ-50 (each 50% liquid) and MB-80 or MX-80 (each 80% liquid) are each described as an alkyl dimethyl benzyl ammonium chloride; BARDAC 4250 and BARQUAT 4250 Z (each 50% active) or BARQUAT 4280 and BARQUAT 4280Z (each 80% active) are each described as alkyl dimethyl benzyl ammonium chloride/alkyl dimethyl ethyl benzyl ammonium chloride. Also, HYAMINE 1622, described as diisobutyl phenoxy ethoxy ethyl dimethyl benzyl ammonium chloride (50% solution); HYAMINE 3500 (50% actives), described as alkyl dimethyl benzyl ammonium chloride (also available as 80% active (HYAMINE 3500-80)); and HYMAINE 2389 described as being based on methyldodecylbenzyl ammonium chloride and/or methyldodecylxylene-bis-trimethyl ammonium chloride. (BARDAC, BARQUAT and HYAMINE are presently commercially available from Lonza, Inc., Fairlawn, N. J.). BTC 50 NF (or BTC 65 NF) is described to be alkyl dimethyl benzyl ammonium chloride (50% active); BTC 99 is described as didecyl dimethyl ammonium chloride (50% active); BTC 776 is described to be myrisalkonium chloride (50% active); BTC 818 is described as being octyl decyl dimethyl ammonium chloride, didecyl dimethyl ammonium chloride, and dioctyl dimethyl ammonium chloride (50% active) (available also as 80% active (BTC 818-80%)); BTC 824 and BTC 835 are each described as being of alkyl dimethyl benzyl ammonium chloride (each 50% active); BTC 885 is described as a combination of BTC 835 and BTC 818 (50% active) (available also as 80% active (BTC 888)); BTC 1010 is described as didecyl dimethyl ammonium chloride (50% active) (also available as 80% active (BTC 1010-80)); BTC 2125 (or BTC 2125 M) is described as alkyl dimethyl benzyl ammonium chloride and alkyl dimethyl ethylbenzyl ammonium chloride (each 50% active) (also available as 80% active (BTC 2125 80 or BTC 2125 M)); BTC 2565 is described as alkyl dimethyl benzyl ammonium chlorides (50% active) (also available as 80% active (BTC 2568)); BTC 8248 (or BTC 8358) is described as alkyl dimethyl benzyl ammonium chloride (80% active) (also available as 90% active (BTC 8249)); ONYXIDE 3300 is described as n-alkyl dimethyl benzyl ammonium saccharinate (95% active). (BTC and ONYXIDE are presently commercially available from Stepan Company, Northfield, Ill). Benzyl-C12-14-alkyldimethylammonium chlorides benzyl C12-C16-alkyl dimethyl chlorides also available as EMPIGEN BAC 50 and EMPIGEN BAC 80. It is an aqueous solution of benzalkonium chloride at ca. 50% or 80% in water respectively. EMPIGEN BAC 50 and EMPIGEN 80 are readily biodegradable, EMPIGEN is commercially available from Innospec Performance Chemicals Polymeric quaternary ammonium salts based on these monomeric structures are also considered desirable for the present invention. One example is POLYQUAT, described as being a 2-butenyldimethyl ammonium chloride polymer.

Preferably the quaternary ammonium compound is benzalkonium chloride.

pH

The cleaning composition of the present invention is alkaline and has a pH of 10 to 14. The alkaline pH allows for good cleaning performance, especially in combination with the abrasive particles. Preferable the composition has a pH of 11 to 13 and more preferably of 11 to 12.

The desired pH can be obtained by methods known in the art, for example by inclusion of an alkaline ingredient. In the present invention the sequestrant, at least in part, contributes to achieving the desired alkaline pH.

Surfactant

The primary cleaning agent in the composition of the present invention are the abrasive particles. To further aid the cleaning performance of the composition, surfactant may be present. Preferably the cleaning composition of the present invention comprises up to 5 wt % of non-ionic surfactant with an HLB of 10 to 15. More preferably the composition comprises 0.5 to 4 wt % non-ionic surfactant, even more preferably 1 to 3 wt %.

Any non-ionic surfactant can suitably be used as long as the surfactant has an HLB of to 15. Preferred non-ionic surfactants are selected from alcohol ethoxylates, alkyl polyglycosides and combinations thereof.

Preferably the non-ionic surfactant is biodegradable and even more preferably the non-ionic surfactant is both natural and biodegradable.

Alcohol Ethoxylates

Suitable alcohol ethoxylate surfactants include the condensation products of a higher alcohol (e.g. an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol. Particularly preferred is Lauryl alcohol condensed with 5, 7 and 9 moles of ethylene oxide (Laureth 5, Laureth 7 and Laureth 9). Preferably, the alcohol ethoxylate surfactant is selected from Laureth 5, Laureth 7 and Laureth 9, or mixtures thereof.

Condensates of 2 to 30 moles of ethylene oxide with sorbitan mono- and tri-C10-C20 alkanoic acid esters having a HLB of 10 to 15 also may be employed as the nonionic surfactant. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Alkyl Polyglycoside Surfactant

Preferably the non-ionic surfactant comprises alkyl polyglycoside surfactant and more preferably the non-ionic surfactant is alkyl polyglycoside surfacant. These surfactant types are both derived from natural sources as well as biodegrable.

As used herein alkyl polyglycosides are compounds having formula I: $R1O(R2O)_b(Z)_a$, wherein R1 is a alkyl radical, having from about 1 to about 30 carbon atoms; R2 is an alkylene radical having from 2 to 4 carbon atoms; Z is a saccharide residue having 5 or 6 carbon atoms; b is a number having a value from 0 to about 12; and a is a number having a value from 1 to about 6 (the degree of polymerization). Due to the method by which they are synthesized, alkyl polyglycosides are generally present as mixtures of alkyl polyglycosides having varying amounts of carbon atoms in the alkyl radical and varying degrees of polymerization. Thus, when referring to alkyl polyglycosides, the alkyl radical is generally referred to as having a range of carbon atoms (e.g. C4/22 referring to a range of alkyl radicals having from 4-22 carbon atoms) and the degree of polymerization is generally referred to as the average degree of polymerization of the mixture.

Preferred alkyl polyglycosides suitable for use in the disclosed cleaning formulation include those having the formula I wherein Z is a glucose residue, b is zero, R1 is an alkyl group that contains 4 to 22 carbon atoms, and the average value of a is about 1-2. Preferably R1 is an alkyl group that contains 8 to 16 carbon atoms, and the average value of a is about 1-2. Such alkyl polyglucosides are commercially available, for example, as GLUCOPON branded alkyl polyglucoside compositions from Cognis Corporation.

Biodegradability

At least part of the ingredients of the cleaning composition, calculated on total product excluding water and inorganic materials, is biodegradable. To be truly biodegradable, a substance or material should break down into carbon dioxide (a nutrient for plants) and water. Naturally occurring minerals that do not cause harm to the ecosystem are already in their natural mineral state and do not need to biodegrade.

Preferably at least 70 wt %, more preferably at least 90 wt % and still more preferably at least 95 wt % of the ingredients is biodegradable. Preferably at least 99 wt % is biodegradable and even more preferably essentially all ingredients are biodegradable.

For the purpose of the invention the term ‘biodegradable’ refers to ‘Inherently and Ultimately biodegradable’ as per the OECD 302 guidelines/tests. Preferably the term ‘biodegradable’ refers to ‘Readily and Ultimately biodegradable’ as per the OECD 301 series or 310 guidelines/tests.

Preferably at least part of the organic ingredients of the cleaning composition, calculated on total product excluding water, is natural. For the purpose of this invention, natural is defined as the ingredient comprising at least 50 wt % plant derived, i.e. from a natural source, material; preferably at least 70 wt %, more preferably at least 90 wt % and still more preferably at least 95 wt %. Preferably at least 99 wt % is plant derived and even more preferably essentially all of a natural ingredient is plant derived.

Preferably at least 70 wt %, more preferably at least 90 wt % and still more preferably at least 95 wt % of the organic ingredients is natural. Preferably at least 99 wt % is natural and even more preferably essentially all organic ingredients are natural.

Further Ingredients

The aqueous cleaning composition of the present invention may comprise further ingredients like for example fragrance. Preferably the composition comprises a biodegradable fragrance.

It may be desired to add an antifoaming agent as a process aid to avoid excessive foaming during mixing of the composition in a large(r) scale factory setting and filling line.

The composition may also comprise other surfactants, but preferably the composition is free from anionic surfactants as these may interfere with the biocidal efficacy of the quaternary ammonium compound.

Method of Stabilizing

The invention also relates to a method of stabilizing an abrasive particles and quaternary ammonium compound comprising aqueous alkaline cleaning composition, by including into the aqueous composition diutan gum and a aminocarboxylate sequestrant. Preferably the aminocarboxylate sequestrant is selected from GLDA, MGDA and combinations thereof.

Stabilization should be understood as keeping the abrasive particles, like for example calcite particles, in suspension upon storage such that they are uniformly distributed.

Preferably the method stabilizes the compositions of the present invention.

Product Format

The composition may be packaged in the form of any commercially available bottle for storing the liquid. The bottle containing the liquid can be of different sizes and shapes to accommodate different volumes of the liquid; preferably between 0.05 and 2 L. The bottle is preferably provided with a dispenser, which enables the consumer an easier mode of dispersion of the liquid. Spray or pump-dispensers may also be used.

The invention will now be illustrated by means of the following non-limiting examples.

EXAMPLES

Viscosity

The viscosity of the liquid compositions was determined using a HAAKE VT 550 viscosimeter at 25° C. and shear rate 20.88 1/s, using stainless steel spindle MVII. The product was left in the cup for 1 minute to thermostat at 25° C. and viscosity value was recorded after 3 minutes.

pH pH of the liquid compositions was measured using Seven-Multi (Mettler Toledo) pH-meter at 25° C.

Example 1

Formulations according to Table 1 were prepared and stored at 37° C. Viscosity and pH values were measured right after preparation (T0) and after 12 weeks (T12). The results are shown in Table 2.

TABLE 1

| (wt % calculated on total product) | | | | | |
|---|---|---|---|---|---|
| Ingredient | 1 | 2 | 3 | 4 | 5 |
| Demin Water [@ 25° C.] | To 100 | To 100 | To 100 | To 100 | To 100 |
| Diutan Gum | 0.15 | 0.20 | 0.25 | 0.30 | 0.17 |
| Antifoam Emulsion (DB310, ex Dow) | 0.006 | 0.006 | 0.006 | 0.006 | 0.006 |
| Undecanol, branched and linear, ethoxylated (Non-Ionic) (Lialet 111.10) | 2.00 | 2.00 | 2.00 | 2.00 | 2.00 |
| Glutamic acid, N,N-diacetic acid, tetra sodium salt (GLDA) | 1.60 | 1.70 | 1.70 | 2.00 | 1.60 |
| Benzalkonium | 0.40 | 0.50 | 0.50 | 1.00 | 0.40 |

TABLE 1-continued

| (wt % calculated on total product) | | | | | |
|---|---|---|---|---|---|
| Ingredient | 1 | 2 | 3 | 4 | 5 |
| chloride (BKC) | | | | | |
| Calcite | 35.00 | 35.00 | 37.00 | — | 40.00 |
| Olive stones | — | — | — | 1 | — |

TABLE 2

| Storage results | | | |
|---|---|---|---|
| Sample | | T0 | T12 |
| 1 | Viscosity | 630 cps | 415 cps |
| | pH | 11.4 | 11.2 |
| 2 | Viscosity | 710 cps | 540 cps |
| | pH | 11.3 | 11 |
| 3 | Viscosity | 800 cps | 650 cps |
| | pH | 11.5 | 11 |
| 4 | Viscosity | 370 cps | 220 cps |
| | pH | 11.6 | 11.4 |
| 5 | Viscosity | 750 cps | 625 cps |
| | pH | 10.9 | 10.4 |

Example 2

Formulations according to Table 3 were prepared. Formulation A did not contain sequestrant and Formulation B contained sodium hydroxide as alkaline agent and did not contain sequestrant. Both formulations failed to provide a stable product with suspended particles.

TABLE 3

| (wt % calculated on total product) | | |
|---|---|---|
| Ingredients | A | B |
| Demin Water [@ 25° C.] | To 100 | To 100 |
| Diutan Gum | 0.25 | 0.25 |
| Antifoam Emulsion (DB310, ex Dow) | 0.006 | 0.006 |
| Undecanol, branched and linear, ethoxylated (Non-Ionic) (Lialet 111.10) | 2.00 | 2.00 |
| Glutamic acid, N,N-diacetic acid, tetra sodium salt (GLDA) | — | — |
| Caustic soda | — | 0.175 |
| Benzalkonium chloride (BKC) | 0.50 | 0.50 |
| Calcite | 35 | 35 |

Example 3

Formulations according to Table 4 were prepared. Viscosity and pH values were measured right after preparation (TO) and after 24 hours (TOVERNIGHT). The results are shown in Table 5.

TABLE 4

| (wt % calculated on total product) | | | |
|---|---|---|---|
| Ingredient | 6 | 7 | 8 |
| Demin Water [@ 25°C] | To 100 | To 100 | To 100 |
| Diutan Gum | 0.25 | 0.25 | 0.25 |
| Antifoam Emulsion (DB310, ex Dow) | 0.006 | 0.006 | 0.006 |
| Undecanol, branched and linear, ethoxylated (Non-Ionic) (Lialet 111.10) | 2.00 | 2.00 | 2.00 |
| TETRA SODIUM EDTA | 1.732 | — | — |

TABLE 4-continued

| (wt % calculated on total product) | | | |
|---|---|---|---|
| Ingredient | 6 | 7 | 8 |
| TRISODIUM METHYLGLYCINE DIACETATE (MGDA) | — | 1.60 | — |
| SODIUM GLUCONATE | — | — | 0.993 |
| Benzalkonium chloride (BKC) | 0.50 | 0.50 | 0.50 |
| Calcite | 35.00 | 35.00 | 35.00 |

TABLE 5

| Storage results | | | |
|---|---|---|---|
| Sample | | T0 | TOVERNIGHT |
| 6 | Viscosity | 710 | 680 |
| | pH | 11.17 | 10.80 |
| 7 | Viscosity | 760 | 670 |
| | pH | 11.24 | 10.92 |
| 8 | Viscosity | 730 | 800 |
| | pH | 8.83 | 8.65 |

The invention claimed is:

1. An aqueous alkaline abrasive cleaning composition comprising a. 1 to 60 wt % abrasive particles;

b. 0.05 to 0.5 wt % diutan gum;

c. 0.01 to 3 wt % aminocarboxylate sequestrant;

d. 0.05 to 3 wt % quaternary ammonium compound;

wherein the composition has a pH from 10 to 14 and wherein the abrasive particles are suspended.

2. The composition according to claim 1, wherein the abrasive particles have a Mohs hardness from 1 to 5.

3. The composition according to claim 1, wherein the abrasive particles have an average particle size between 2 and 500 micron.

4. The composition according to claim 1, wherein the abrasive particles are derived from carbonate and/or silicate based mineral.

5. The composition according to any claim 1, wherein the quaternary ammonium compound is selected from didecyl dimethyl ammonium chloride, dioctyl dimethyl ammonium chloride, alkyl dimethyl benzyl ammonium chloride, diisobutyl phenoxy ethoxy ethyl dimethyl benzyl ammonium chloride, alkyl dimethyl benzyl ammonium saccharinate, octyl decyl dimethyl ammonium chloride, alkyl dimethyl ethyl benzyl ammonium chloride, methyldodecylbenzyl ammonium chloride, methyldodecylxylene-bis-trimethyl ammonium chloride, methyl benzethonium chloride, cetyl pyrinidinium chloride, cetrimonium bromide and combinations thereof.

6. The composition according to claim 1, wherein the quaternary ammonium compound is benzalkonium chloride.

7. The composition according to claim 1, wherein the sequestrant is selected from glutamic acid N,N-diacetic acid (GLDA), methyl glycine diacetic acid (MGDA) and combinations thereof.

8. The composition according to claim 1, wherein the sequestrant comprises MGDA.

9. The composition according to claim 1, wherein the pH is from 11 to 13.

10. The composition according to claim 1, wherein the composition has a viscosity of 10 to 2000 mPa·s @ 20 $s^{-1}$ at 25° C.

11. The composition according to claim 1 further comprising up to 5 wt % of non-ionic surfactant with an HLB of 10 to 15.

12. A method of stabilizing an abrasive particles and quaternary ammonium compound present in an aqueous alkaline cleaning composition, by including into the aqueous composition diutan gum and a aminocarboxylate sequestrant.

13. The method according to claim 12 wherein the sequestrant is selected from glutamic acid N,N-diacetic acid (GLDA), methyl glycine diacetic acid (MGDA) and combinations thereof.

14. The method according to claim 12, wherein the composition comprising a. 1 to 60 wt % abrasive particles;

b. 0.05 to 0.5 wt % diutan gum;

c. 0.01 to 3 wt % aminocarboxylate sequestrant;

d. 0.05 to 3 wt % quaternary ammonium compound;

wherein the composition has a pH from 10 to 14 and wherein the abrasive particles are suspended.

* * * * *